United States Patent
Rane et al.

(10) Patent No.: US 9,036,876 B2
(45) Date of Patent: May 19, 2015

(54) METHOD AND SYSTEM FOR AUTHENTICATING BIOMETRIC DATA

(71) Applicant: Mitsubishi Electric Research Laboratories, Inc., Cambridge, MA (US)

(72) Inventors: Shantanu Rane, Cambridge, MA (US); Ravi Garg, College Park, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 178 days.

(21) Appl. No.: 13/874,766

(22) Filed: May 1, 2013

(65) Prior Publication Data

US 2014/0331059 A1 Nov. 6, 2014

(51) Int. Cl.
*G06K 9/00* (2006.01)
*G06F 21/32* (2013.01)

(52) U.S. Cl.
CPC ............ *G06K 9/00093* (2013.01); *G06F 21/32* (2013.01); *G06K 9/00073* (2013.01)

(58) Field of Classification Search
USPC .......................................................... 382/124
See application file for complete search history.

(56) References Cited

U.S. PATENT DOCUMENTS

| | | | | |
|---|---|---|---|---|
| 4,135,147 A | * | 1/1979 | Riganati et al. | 382/125 |
| 2009/0285459 A1 | * | 11/2009 | Aggarwal et al. | 382/125 |
| 2012/0314911 A1 | * | 12/2012 | Paul et al. | 382/115 |
| 2014/0016830 A1 | * | 1/2014 | Wang et al. | 382/115 |

OTHER PUBLICATIONS

Barni et al., "Privacy-Preserving Fingercode Authentication", 2010, Retrieved from Internet from <URL:http://www.google.com/url?sa=t&rct=j&q=&esrc=s&frm=1&source=web&cd=3&cad=rja&uact=8&ved=OCC8QFjAC&url=http%3A%2P/02Fclem.dii.unisi.it%2F~vipp%2Ffiles%2Fpublications%2F2010Privacy-PeservingFingercodeAuthentication.pdf&ei=swmXVKTOKaK_sQTdyIKABg&usg=A.*

Hsu et al., "Image Feature Extraction in Encryption Domain With Privacy-Preserving SIFT", 2012, Retrieved from Internet on Dec. 21, 2014 from <URL: http://www.google.com/url?sa=t&rct=j&q=&esrc=s&frm=1&source=web&cd=4&cad=rja&uact=8&ved=0CDcQFjAD&url=http%3A%2F%2Fwww.iis.sinica.edu.tw%2Fpapers%2Flcs%2F14699-F.pdf&ei=swmXVKTOKaK_sQTdyIKABg&usg=AFQjCNFccl_.*

"BlackBerry Enterprise Solution Security", 2006, Retrieved from the Internet on Dec. 21, 2014, URL:<http://www.google.com/url?sa=t&rct=j&q=&esrc=s&frm=1&source=web&cd=1&ved=0CCAQFjAA&url=ftp%3A%2F%2Fftp.toyota.com%2FBlackberry%2FBES%2FBES41%2FBlackBerry_Enterprise_Solution_Security_version_4.pdf&ei=TVuXVMK-AfS_sQS54oLICw&usg=AFQjCNFmSxiZMEQ7sfA67YoOEn.*

Shahandashtil et al., Private Fingerprint Matching, 2012, Retrieved from Internet on Dec. 21, 2014 from <URL:https://www.google.com/url?sa=t&rct=j&q=&esrc=s&frm=1&source=web&cd=1&cad=rja&uact=8&ved=0CCAQFjAA&url=https%3A%2F%2Feprint.iacr.org%2F2012%2F219.pdf&ei=swmXVKTOKaK_sQTdyIKABg&usg=AFQjCNGgTTUDXxjo_mppntcVGQC6OaVSvg&bvm=bv.82001339,d.cWc>.*

* cited by examiner

*Primary Examiner* — Gregory F Cunningham
(74) *Attorney, Agent, or Firm* — Dirk Brinkman; Gene Vinokur (57) ABSTRACT

A method for authenticating biometric data determines a first set of descriptors of a fingerprint. Each descriptor in the first set represents a region of the fingerprint that includes multiple minutiae. The method compares each descriptor in the first set of descriptors with each descriptor in a second set of descriptors to determine a number of matching descriptors and compares the number of matching descriptors with a threshold for authenticating the biometric data.

12 Claims, 9 Drawing Sheets

METHOD AND SYSTEM FOR AUTHENTICATING BIOMETRIC DATA

FIELD OF THE INVENTION

The invention relates generally to the field of biometrics, and more particularly to authenticating biometric data.

BACKGROUND OF THE INVENTION

Authentication with biometric data, e.g., speech, a fingerprint, iris appearance is an alternative to conventional passwords. The biometric data do not need to be remembered memorized, and are difficult to replicate.

Fingerprints are one of the most common sources of biometric data for authentication. During authentication, discriminative features from an enrolment fingerprint are compared with features from a probe fingerprint. However, many conventional fingerprint-based authentication systems assume that the features determined from the enrolment biometrics are stored in an unencrypted form in a biometric database connected to the access control device.

This assumption can pose a security risk when the features form the enrolment and probe fingerprints are encrypted. Encryption ensures that an adversary who compromises the database cannot discover the fingerprint features of enrolled users. However, for such systems, the access control device must perform the comparison of the probe features and the enrolment features in an encrypted domain.

Most of the methods for comparison of encrypted biometric features have some common characteristics. The feature extraction process generates feature vectors with predetermined lengths, which facilitates comparison of the biometric features based on distances between the vectors. Secure and nearly real-time protocols for determining distance metrics such as Euclidean. Hamming and absolute distances are known.

To guarantee accurate biometric, matching, alignment must be performed between the enrolment and probe fingerprints prior to feature extraction. Typically, the unencrypted alignment parameters, such as the locations of high curvature points on the enrolment fingerprint, are used for the alignment, see, e.g., U.S. Patent Document 2011/0133567. These alignment parameters allow the access control device to align the probe fingerprint to the enrolment fingerprint before extracting probe features and comparing the probe features with the enrolment features in the encrypted domain. However, storing unencrypted alignment parameters poses a security risk.

The above characteristics impose constraints on the design of the access control system. A fixed-length feature representation reduces the flexibility of the feature comparing because such representation cannot accommodate, for example, feature matching from fingerprint images that have been cropped or fingerprints that produce a small number minutiae. The unencrypted alignment information may allow the adversary to guess whether a fingerprint contains core, or tent or delta structures, thereby simplifying the vectors that can be used to attack the system.

Accordingly, there is a need for a fingerprint feature extraction and biometric authentication method suitable for biometric authentication in the encrypted domain, which enables enrolment and probe features to have different lengths, and does not require explicit alignment, thus removing the need to store unencrypted alignment parameters.

SUMMARY OF THE INVENTION

Some embodiments of the invention are based on a realization that alignment of the features of the fingerprint extracted during an enrolment and an authentication stage is required for pairwise comparison of corresponding features. Specifically, an enrolment feature extracted from a specific location of the fingerprint is compared with a probe feature extracted from the same location of the fingerprint. Typically, all features are compared concurrently and the alignment ensures correct identification of the corresponding features.

However, if the features are compared individually, i.e., each enrolment feature is compared with each probe feature, the alignment is implicit, i.e., the alignment happens indirectly, hen the corresponding features are matched. The number of matches can be utilized to make an authentication decision based on a suitable distance threshold.

Typically, the features extracted from the fingerprints represent minutia. Some embodiments are based on recognition that the comparison of the features representing the minutia can be suboptimal. This is because the minutia may not distinctive enough, such that the enrolment feature representing the minutia at the specific location of the fingerprint can match the probe feature representing the minutia at a different location. Thus, pair wise comparison of the minutia can increase the probability of false authentications.

Such problem can be avoided, however, when the comparison is performed between features representing the geometry of local neighborhoods of minutiae The individual characteristic of each minutia in the neighborhood, as well as relative position and orientation among the minutiae increase distinctiveness of the extracted features, and thus increase the probability that individual comparisons of such distinct features match only the corresponding features extracted from the same location in the fingerprint.

Based on this realization, some embodiments determine local neighborhoods around certain detected minutiae, and extract the features based on those neighborhoods. The locality of the features provides accuracy when the features are subject to rotation and translation. Feature vectors can be compared using secure primitives. The process of determining the scores to identify genuine users Or impostors implicitly yields the best alignment without needing to store unencrypted alignment parameters.

Accordingly, one embodiment discloses a method for authenticating biometric data obtained from a fingerprint of a user. The method includes determining a set of regions of the fingerprint, such that each region includes multiple minutiae of the fingerprint; determining, for each region, a descriptor representing a structure of the fingerprint in the region to produce a first set of descriptors: comparing each descriptor in the first set of descriptors with each descriptor in a second set of descriptors to determine a number of matching descriptors, wherein the second set of descriptors is determined during an enrolment of the biometric data of the user; and comparing the number of matching descriptors with a threshold for authenticating the biometric data. The steps of the method are performed by a processor.

Another embodiment discloses a system for authenticating biometric data obtained from a fingerprint of a user. The system includes a processor for determining a set of regions of the fingerprint, such that each region includes multiple minutiae of the fingerprint; determining, for each region, a descriptor representing a structure of the fingerprint in the region to produce a first set of descriptors; comparing each descriptor in the first set of descriptors with each descriptor in a second set of descriptors to determine a number of matching descriptors, wherein the second set of descriptors is determined during an enrolment of the biometric data of the user; and comparing the number of matching descriptors with a threshold for authenticating the biometric data.

Yet another embodiment discloses a biometric authentication system that includes an access control device for determining a first set of descriptors of a probe fingerprint presented for an authentication of a user, wherein each descriptor in the first set represents a region of the probe fingerprint that includes multiple minutiae; a server for determining a second set of descriptors of a enrolment fingerprint presented for an enrolment of the user, wherein each descriptor in the second set represent a region of the enrolment fingerprint that includes multiple minutiae; a processor for comparing, each descriptor in the first set of descriptors with each descriptor in a second set of descriptors to determine a number of matching descriptors; and an authentication server for comparing the number of matching descriptors with a threshold to make an authentication decision

DETAILED DESCRIPTION OF THE PREFERRED EMBODIMENTS

Figure 1:
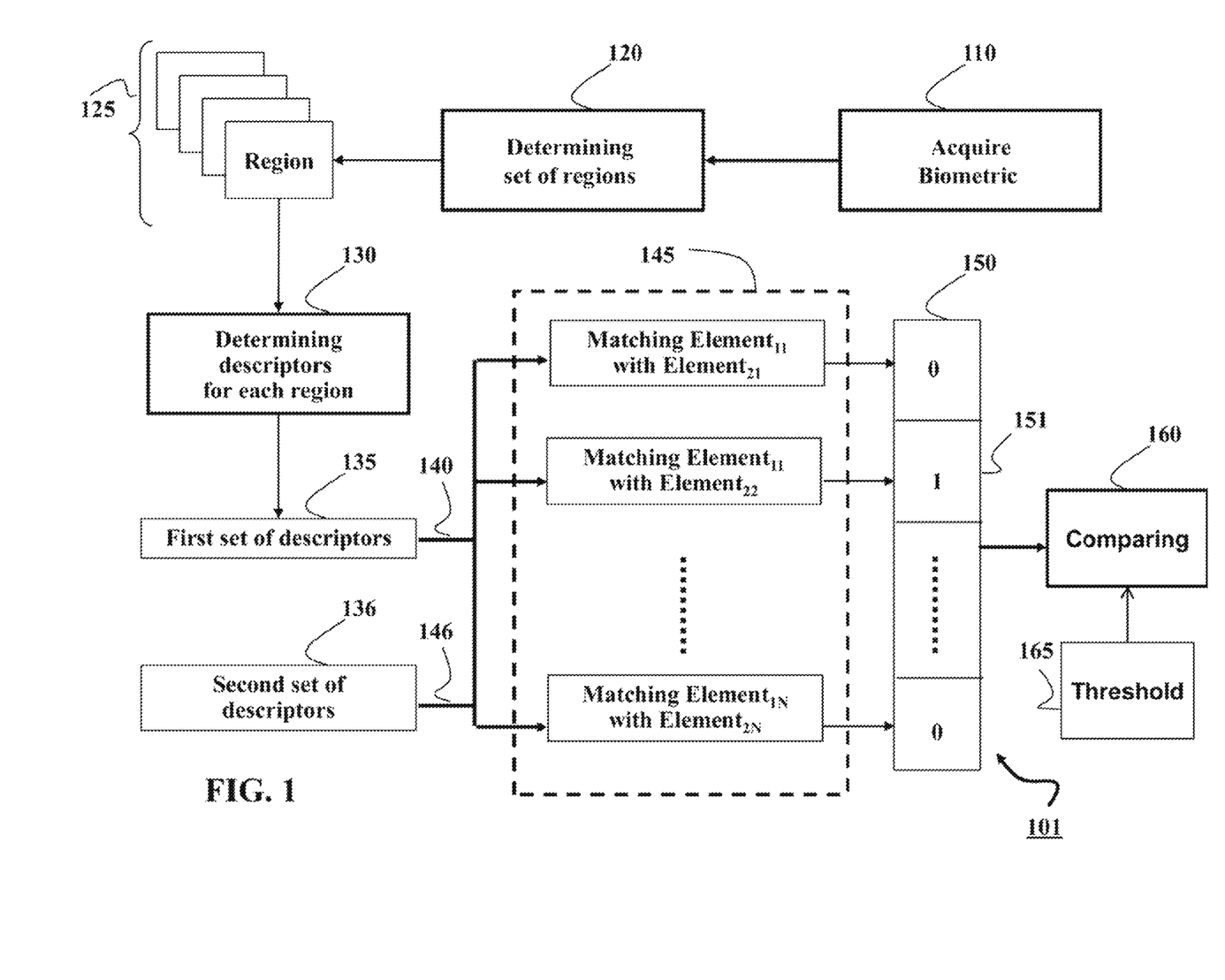
FIG. 1 is a block diagram of a method for biometric authentication using biometric, data of a fingerprint of a user according to some embodiments of the invention.

FIG. 1 shows a system and method for biometric authentication using biometric data 110 obtained from an image of a fingerprint of a user. The biometric data 110 can be acquired during, e.g., an authentication stage, e.g., when users request an authentication based on their fingerprints. A first set of descriptors 135 is determined from the biometric, data 110 and is compared 145 with a second set of descriptors 136 presented during the authentication. For example, the second set of descriptors is determined during an enrolment stage when the user is registered in a biometric database. The first and the second set of descriptors are determined using the same principles described below. Some steps of the method can be performed by a processor 101, e.g., a processor of an access control device. Additionally or alternatively, the steps of the method can be performed by a processor associated with the biometric database From the biometric of the fingerprint 110, the set of regions 125 is determined. Some embodiments of the invention are based on a realization that individual comparison of the features acquired during the enrolment and the authentication stage performs indirect alignment. A number of matching features can he used to make the authentication decision.

To make the comparison process efficient, the extracted features need to be distinctive. Accordingly, some embodiments determine 120 the set of regions of the fingerprint, such that each region surrounds multiple minutiae of the fingerprint. This embodiment is based on a realization that individual characteristic of each minutia in the region, as well, as relative position and orientation among the minutiae increase distinctiveness of the region and thus distinctiveness of the features extracted from the region.

In addition, the locality of the features provides accuracy and invariance to rotation and translation of the probe fingerprint relative to the enrolment fingerprint. Feature vectors can be now compared using operations that can be performed using cryptographic primitives that compute distances or correlations in the encrypted domain. The process of determining the scores for genuine users or impostor and implicitly yields the best alignment without needing to store unencrypted alignment parameters,.

Accordingly, some embodiments determine 130, for each region, a descriptor representing a structure of the fingerprint in the region to produce the first set of descriptors 135 and compare 145 each descriptor in the first set of descriptors with each descriptor in the second set of descriptors 136 presented for the biometric authentication. Both sets of descriptors are determined using the same principle from the set of regions determined based on the same rules. The only difference is that one set of descriptors, e.g. the set 135, is determined from the fingerprint acquired during the authentication stage by the access control device, and another set:, e.g., the set 136, is determined from the fingerprint acquired during the enrolment stage.

The comparing 145 includes individual comparison of the descriptors, i.e., each descriptor in the first set of descriptors is compared with each descriptor in a second set of descriptors presented for the biometric authentication to determine a number 150 of matching descriptors. If the match is found, e.g., if the first element of the first set is matching 151 the second element of the second set, the number 150 is increased by one. Next, the number 150 of matching descriptors is compared 160 with a threshold 165 to authenticate the user.

In one embodiment, the matching of the descriptors is determined in two stages. For each descriptor in the probe fingerprint presented at the time of authentication, the first step involves finding the nearest neighboring descriptor in the enrolment fingerprint. The second step involves comparing the distance of this nearest neighboring descriptor against a distance threshold to ensure that the nearest neighbor is indeed near enough.

As described above, the individual comparison of descriptors result in indirect alignment of the fingerprints, and thus eliminates the need for explicit alignment steps that are usually performed using unencrypted information. Thus, the principles employed by various embodiments of the invention are especially advantageous for secure biometric authentication.

To that end, some embodiments of the invention determine only encryption of the first and/or the second set of descriptors. For example, the first set of descriptors is encrypted with a public key by an access control device, and the second set of the descriptors is encrypted with the same public key by an enrolment server and stored in the biometric database in the encrypted format. During the authentication, the first and the second descriptors are matched 145 in the encrypted domain.

For example, some embodiments use properties of homomorphic cryptosystems for determining distance metrics such as Euclidean. Hamming and absolute distances of the first and the second set of descriptors. In those embodiments, the first and the second sets of descriptors are encrypted with a public key of the homomorphic cryptosystein, such that the comparing of each descriptor is performed in the encrypted domain using properties homomorphism.

Determining Regions

Figure 2A:
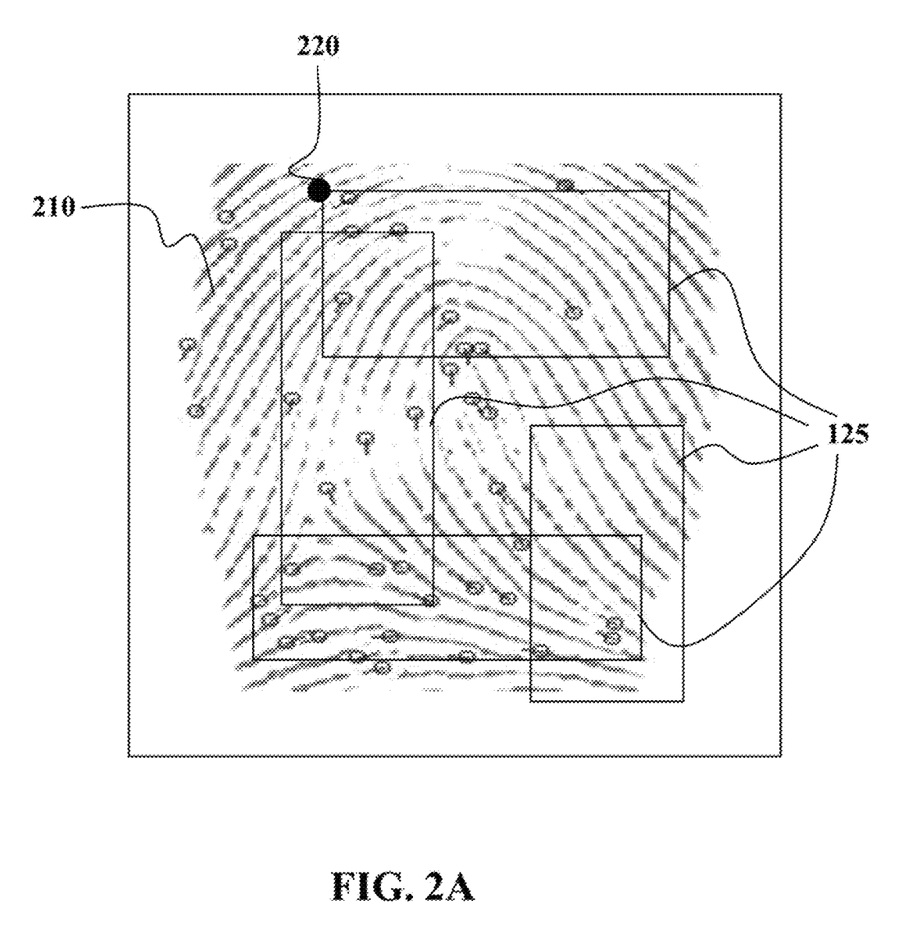
FIGS. 2A and 2B are schematics of a set of regions of a fingerprint according to various embodiments of the invention.

FIG. 2A shows an example of partitioning a fingerprint 210 into a set of regions 125. For example, in one embodiment, the regions have rectangular shapes. Each rectangle is generated, for example, at an origin 220, which indicates an upper-left corner of the rectangle., and is specified with a width and a height. Typically, the shape and dimensions of the region are determined in advance, but may vary for fingerprints of different users.

Figure 2B:
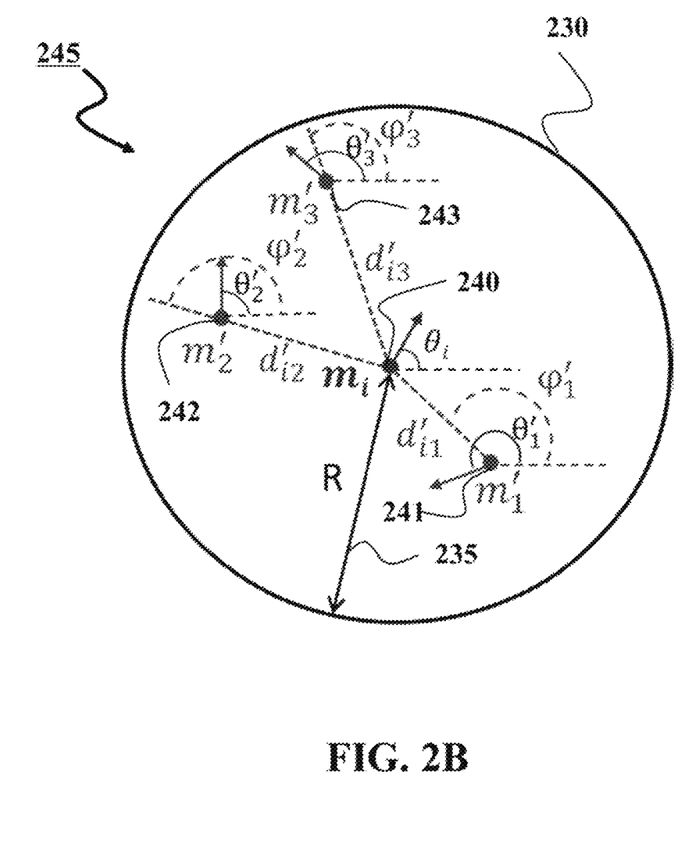

FIG. 2B shows a schematic of another region 245 determined using keypoint minutia. The keypoint is defined as a minutia 240 that has at least 17 minutiae as its neighbors within a region of predetermined shape and dimensions, e.g., a ball 230 of radius R 235, wherein n is a predetermined number greater than one. In the example of FIG. 2B, the predetermined number n equals three, and the region 245 includes minutiae 241, 242, and 243.

Let $U_k$ be the number of minutiae in the $k^{th}$ image of the fingerprint. Typically, $U_k$ varies for different fingers. Further, $U_k$ also varies for the same finger due to noise. The $1^{th}$ minutia in the $k^{th}$ fingerprint image is represented as $m_i^k = [x_i^k, y_i^k, \theta_i^k]$ using the X-coordinate, Y-coordinate, and Θ-coordinate of the minutia point.

The set of neighbors of $m_i^k$ is $$D(m_i^k) = \{m_j^k : d(m_i^k, m_j^k) < R, j=1, \ldots, U_k, j \neq i\}$$

where $d(m_i^k, m_j^k) = \sqrt{(x_i^k - x_j^k)^2 + (y_i^k - y_j^k)^2}$, where R is a predefined radius. Then, the n-nearest neighbor set of $m_i^k$ is the subset of $D(m_i^k)$ containing n elements closest in Euclidean distance to $m_i^k$. The n-nearest: neighbor set of m is denoted by $N(m_i^k) = \{\overline{m}_1^k, \ldots, \overline{m}_n^k\}$, where $\overline{m}_l^k = \{\overline{x}_l^k, \overline{y}_l^k, \overline{\theta}_l^k\}$, l=1, 2, ..., n is the $l^{th}$ nearest neighbor of $m_i^k$. Any minutia that has a n-nearest neighbor set: is referred to as a keypoint.

Figure 2C:
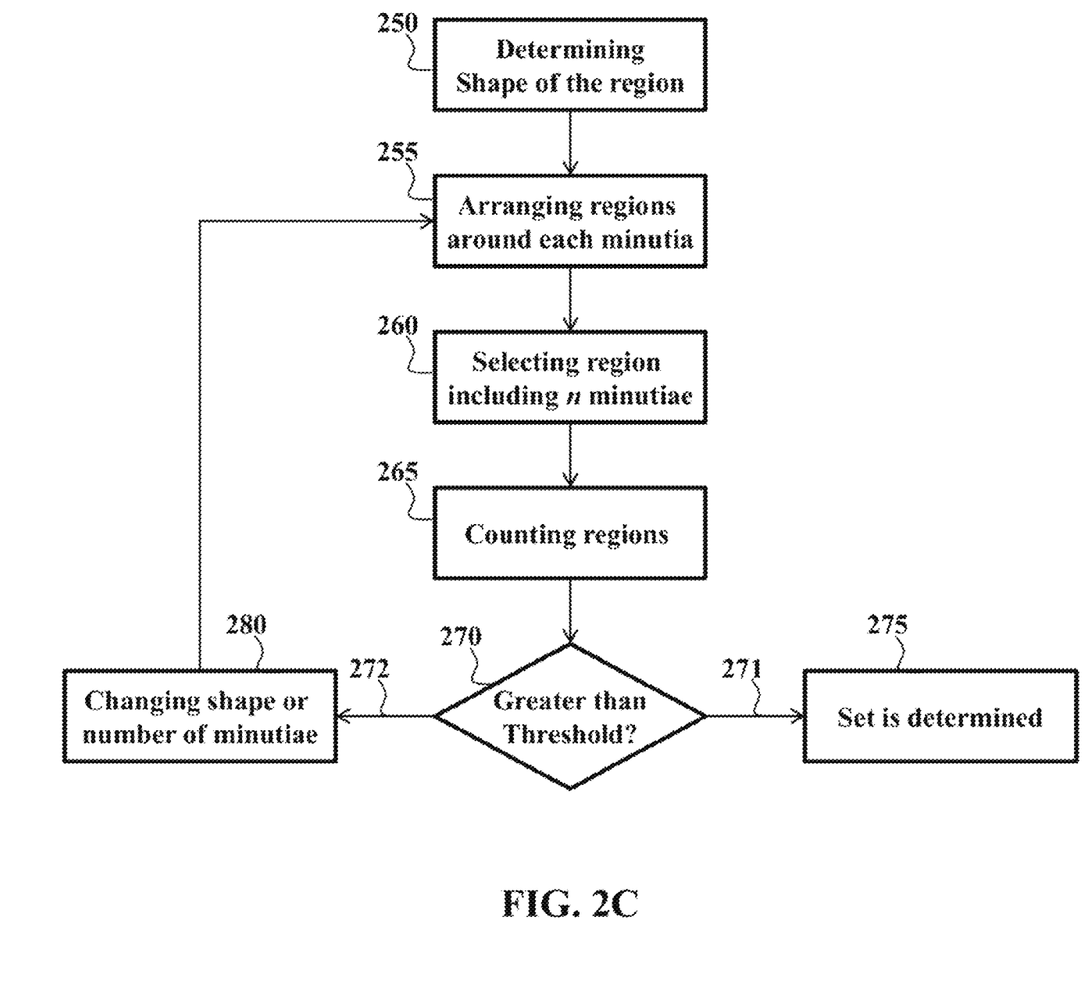
FIG. 2C is a flowchart of a method for determining the set of regions according to some embodiments of the invention.

FIG. 2C shows a flowchart of a method for determining the set of regions according some embodiments of the invention. The shape and dimensions of the region are determined 250 and regions of that shape and dimension are arranged 255 around each minutia in the fingerprint. A region is selected 260 in the set of regions, if the minutia of the region neighboring at least n minutiae within the region, wherein n is a predetermined number greater than one.

Additionally, one embodiment updates the set of regions, if the set does not include enough regions for efficient comparison. For example, fingerprints of some users may include sparse arrangement of the minutiae, and for those users, the radius R 235 is increased. Accordingly, this embodiment counts 265 the number of regions in the set, and compares 270 the number of regions with a threshold. If the number of region is greater 271 than the threshold, than the set is determined 275. Otherwise 272, the embodiment changes at least one of the shape of the region (e.g. enlarges the radius of the circle) the dimensions of the region or the predetermined number of the n minutiae, and repeats the steps for determining the set of regions.

Biometric Data

Figure 3:
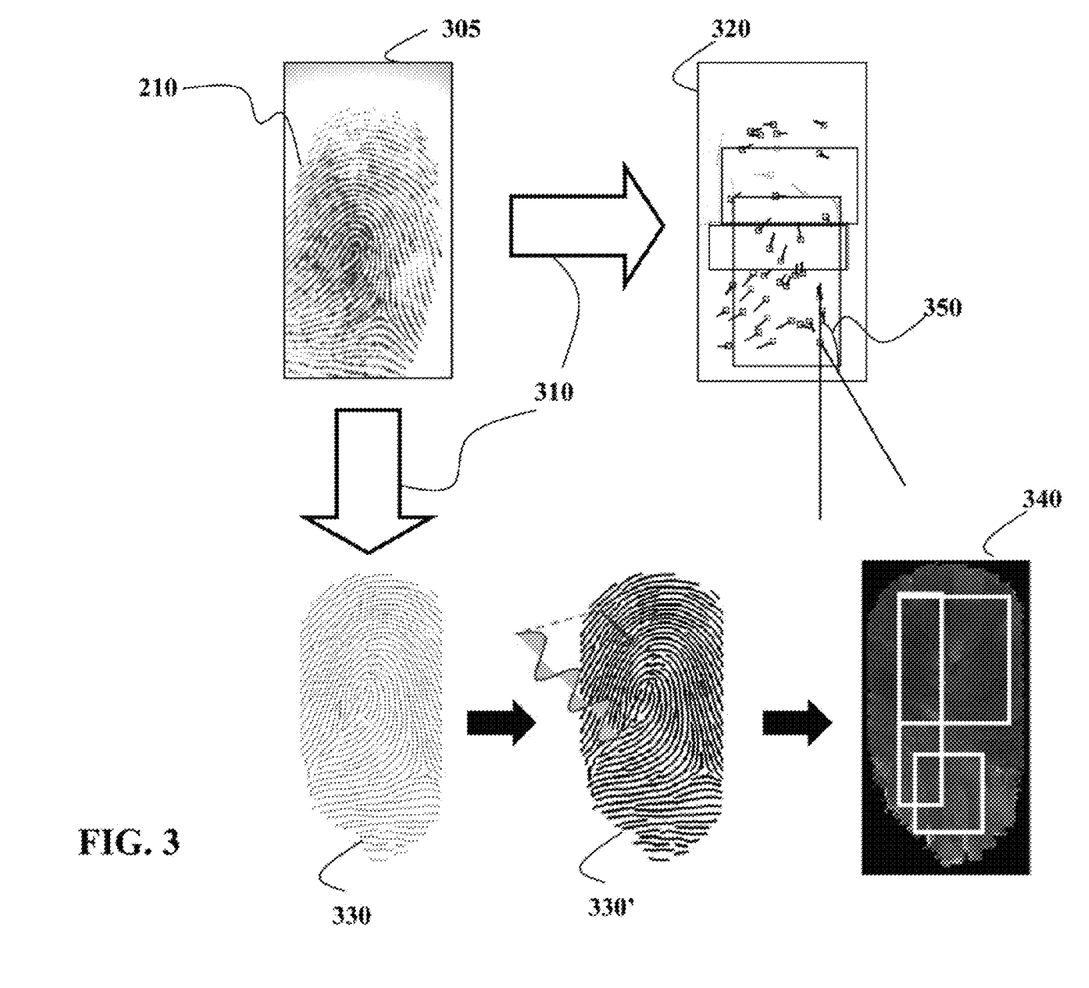
FIG. 3 is a schematic of a representation of biometrics according different embodiments of the invention.

FIG. 3 shows examples of the biometric data of a fingerprint of a user used by different embodiments. For example, an image of the fingerprint 210 can be represented 310 by a minutia map 320 andlor a ridge map 330-330' or a ridge wavelength map 340. The ridge map can be a thin ridge map 330 or a thick ridge map 330'. Minutia maps 320 and ridge map images 330 and 330' can be determined by methods known in the art, The fingerprint minutia map is a data structure used to represent an image of the fingerprint. The minutia map includes minutiae in, e.g., a two- or a. three-dimensional space. The minutiae are extracted from an image 305 of fingerprint. Locations and orientations are associated with the minutiae, and related to ridges in the fingerprint. Specifically, each minutia is generated where a fingerprint ridge ends, or bifurcates.

Figure 4A:
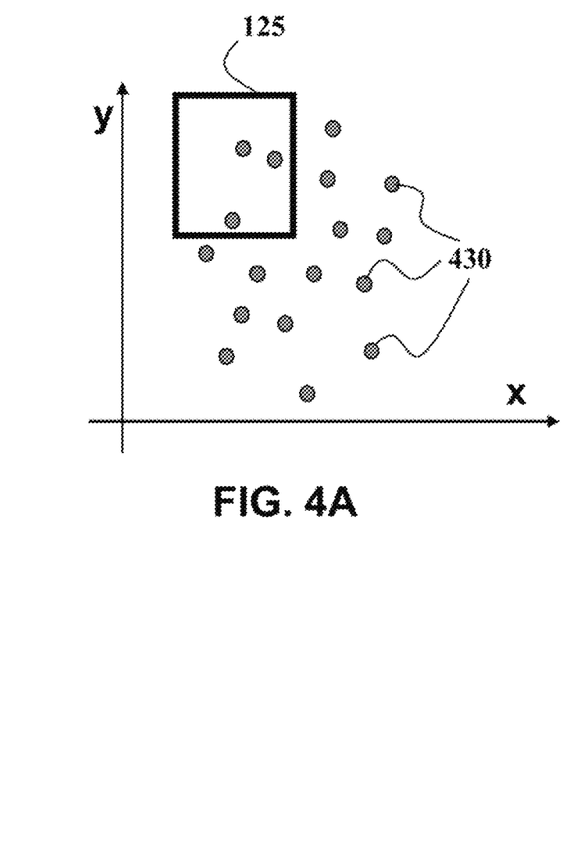
FIGS. 4A and 4B are schematics of biometric data.

FIG. 4A shows an example of one embodiment, wherein each minutia 430 is associated with two coordinates X and Y, wherein X and Y are spatial coordinates of the minutia in the image. In this embodiment, the regions 125 are two dimensional, e.g., a square, a rectangle, a circle, or an oval.

Figure 4B:
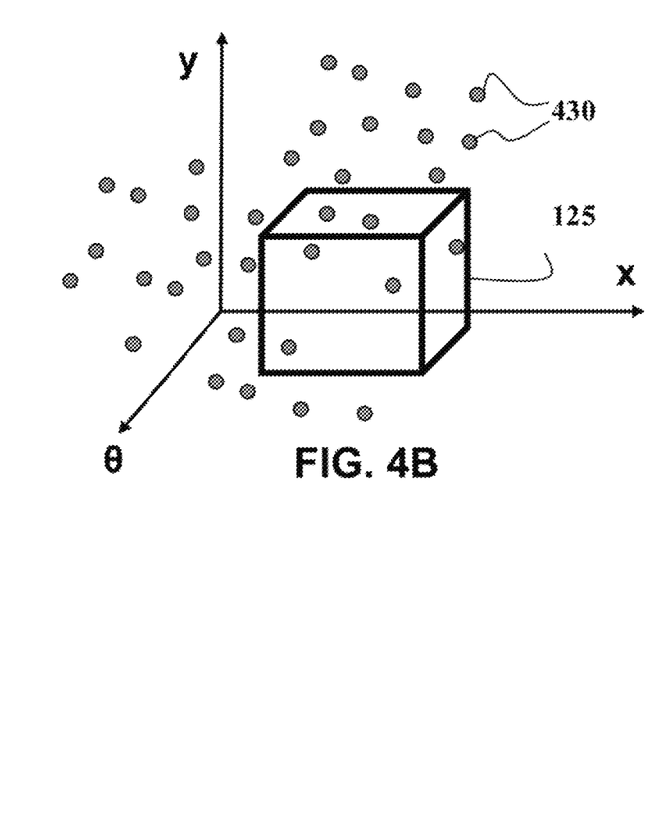

FIG. 4B shows an example of another embodiment, which includes additional data about the fingerprints, such as orientation of the minutiae. Each minutia 430 is associated with three coordinates X, Y. and θ, wherein X and Y are the spatial coordinates of the minutia in the image 305, and θ is an angle 350 of the tangent to the fingerprint ridge from which the minutia is derived. The angle θ ranges from 0 to 360 degrees. In this embodiment, the regions 125 are three dimensional, e.g., a cube, an ellipsoid or a sphere.

The fingerprint ridge map is the image 330 of the ridges of the fingerprint. The ridge map identifies fingerprint information that is sufficiently independent of the information contained in the minutiae. Sometimes, when the fingerprint image is very noisy, minutiae extraction is difficult or unreliable, but in this case the fingerprint ridges can generate more reliable features. In some embodiments, a ridge wavelength image 340 is extracted from the fingerprint ridge map.

Descriptors

Various embodiment of the invention determine descriptors based on the features of the regions representing local structure of the fingerprint within the region. In some embodiments, the features are extracted from the regions based on one or combination of relative locations of close minutia points, local texture and local ridge orientation.

Minutiae-Based Features

In some embodiments of the invention, the descriptor of the region includes minutiae-based features representing at least one or combination of relative distances of minutiae within the region, relative orientations of the minutiae within the region, and relative radial placement of the minutiae within the region.

For example, one embodiment that uses keypoints for determining the set of regions, extracts, for each keypoint $m_i^k$, features that can uniquely represent the local geometric structure of $N(m_i^k)$ relative to $m_i^k$. For this purpose, some embodiments denote the minutia-based feature vector around $m_i^k$ as $$m_i^k = [d_{i1}^k, \ldots, d_{in}^k, \theta_{i1}^k, \ldots, \theta_{in}^k, \phi_{i1}^k, \ldots, \phi_{in}^k].$$

where each feature element is given by $$d_{ij}^k = (1/R) d(m_i^k, \overline{m}_j^k),$$

$$\theta_{ij}^k = \begin{cases} \dfrac{\overline{\theta}_j^k - \theta_i^k}{2\pi} & \text{if } \overline{\theta}_j^k \geq \theta_i^k \\ \dfrac{2\pi - (\theta_i^k - \overline{\theta}_j^k)}{2\pi} & \text{if } \overline{\theta}_j^k < \theta_i^k \end{cases},$$

-continued $$\psi_{ij}^k = \begin{cases} \dfrac{\overline{\psi}_j^k - \theta_i^k}{2\pi} & \text{if } \overline{\psi}_j^k \geq \theta_i^k \\ \dfrac{2\pi - (\theta_i^k - \overline{\psi}_j^k)}{2\pi} & \text{if } \overline{\psi}_j^k < \theta_i^k \end{cases},$$

where $\overline{\psi}_j^k$ measures the radial placement of the nearest neighbor minutia around $m_i^k$ according to:

$$\beta = \tan^{-1}\left(\frac{|\overline{y}_j^k - y_i^k|}{|\overline{x}_j^k - x_i^k|}\right),$$

and $$\overline{\psi}_j^k = \begin{cases} \beta & \text{if } \overline{y}_j^k > y_i^k, \overline{x}_j^k > x_i^k \\ \pi - \beta & \text{if } \overline{y}_j^k > y_i^k, \overline{x}_j^k < x_i^k \\ \pi + \beta & \text{if } \overline{y}_j^k < y_i^k, \overline{x}_j^k < x_i^k \\ 2\pi - \beta & \text{if } \overline{y}_j^k < y_i^k, \overline{x}_j^k > x_i^k \end{cases}.$$

Formulating the feature vectors as above ensures that each kature value is the range [0,1], and that keypoint features are invariant to rotation and translation with respect to the keypoint. A diagrammatic representation of the minutiae-based features around a keypoint $m_i^k$ is given in FIG. 2B for the case of n=3, The minutia-based features represent the relative minutiae distances, relative minutiae orientations and the relative radial minutiae placement around the keypoint, thus representing the local structure in the neighborhood of the keypoint In some fingerprint images, the number of keypoints, i.e., minutiae with at least n-nearest neighbors may he small, which decreases the matching performance.

To mitigate the effect of such fingerprints, some embodiments vary the shape or dimensions of the regions. Additionally or alternatively, some embodiments include other features in the descriptor, e.g., texture and orientation-based features, as described below.

Texture-Based Features

To extract the texture information around the location of keypoint $m_i^k$, the region $R_1$ around $m_i^k$ is processed by directional Gabor filters with dominant angle $$\frac{\pi * p}{P},$$

p={0, 1, . . . , P−1} relative to $\theta_i^k$. From the output of each filter, the embodiments determine the standard deviation of the output image patch as a feature. The determined texture-based feature can be represented as:

$$t_i^k = \frac{1}{t_{max}}[t_0, t_1, \ldots, t_{P-1}],$$

where $t_p$, p={0,1, . . . , P−1} denotes standard deviation of the image patch obtained as the output of the directional Gabor filters at an angle of $$\frac{\pi p}{P}.$$

The normalizing constant $t_{max}$ is the maximum value of the standard deviation determined for all image patches around all key points in the training set, and it is used to restrict each feature vector into the range [0,1].

Figure 5:
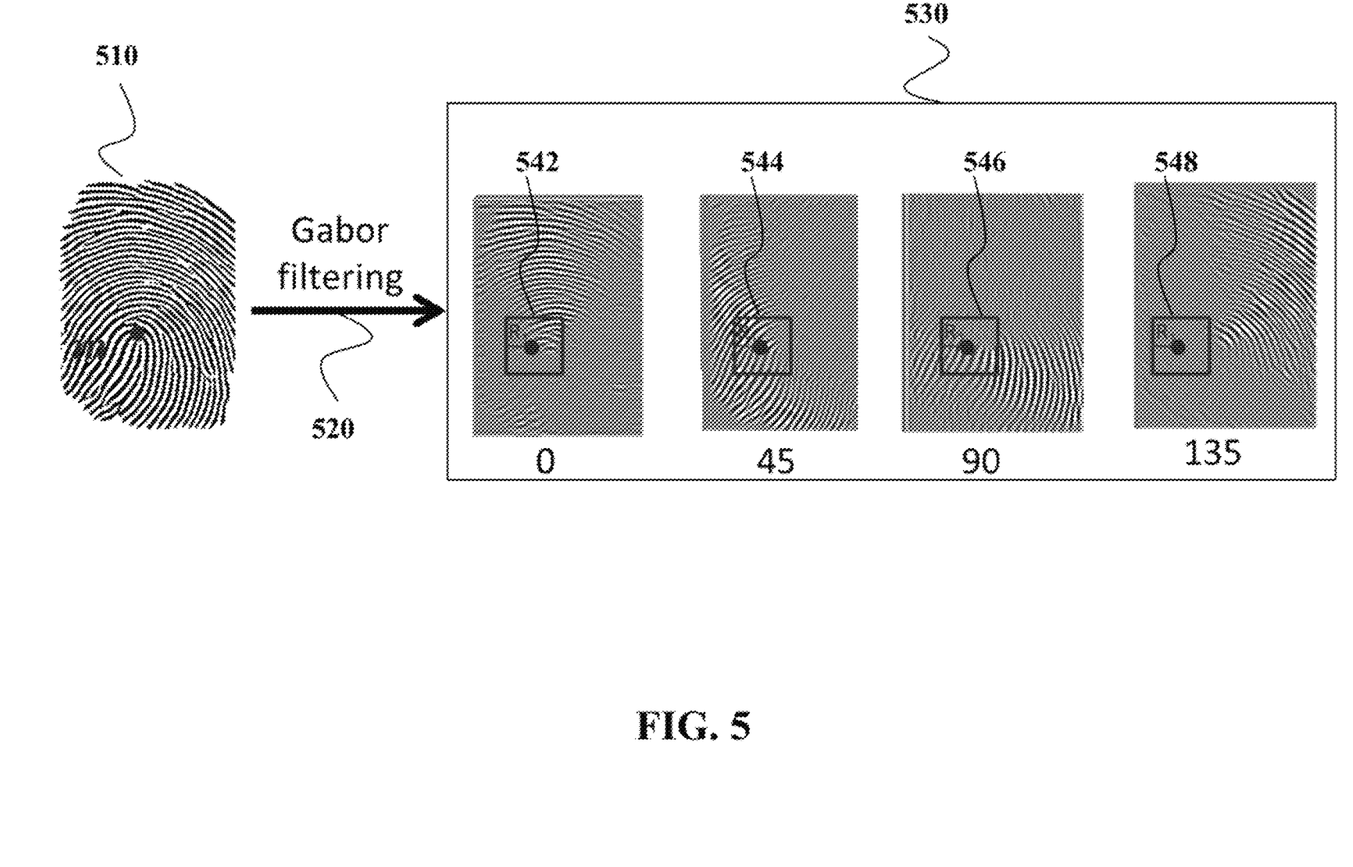
FIG. 5 is a schematic of extracting texture-based features in an image of a fingerprint using Gabor filtering.

FIG. 5 shows an example of extraction the texture-based feature 530 of an image of the fingerprint 510 for P=4 using the Gabor filtering 520. The filtered images show the dominant ridge orientation in the range of corresponding angle of the directional Gabor filters. The regions 542, 544, 546, and 548 represent square patch of dimension $R_1$ in which the standard deviation is determined.

Orientation-Based Feature

Figure 6:
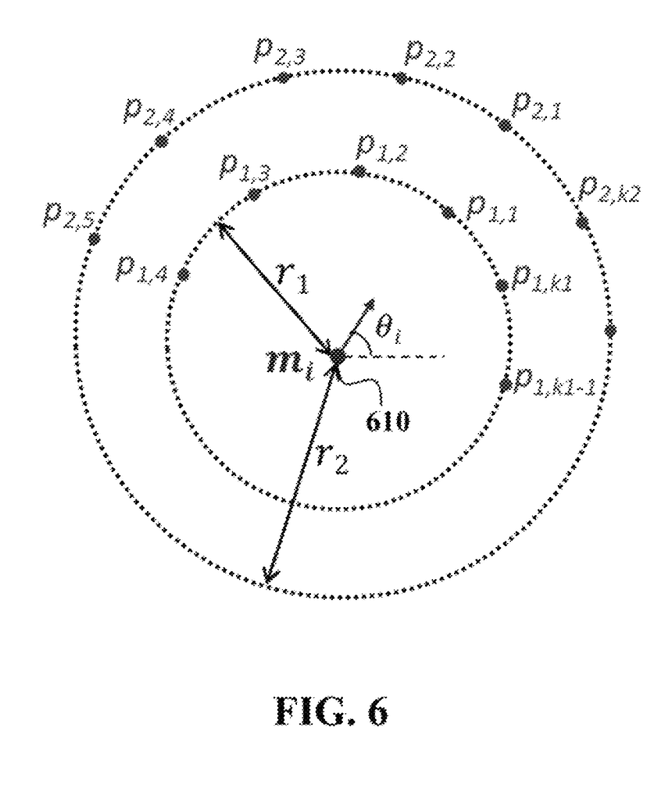
FIG. 6 is a schematic of extracting orientation-based features by sampling ridge orientations in a regular radial sampling grid according to one embodiment of the invention.

FIG. 6 shows the extraction of ridge orientations in a regular radial sampling grid around the keypoint. The sampling grid around a minutiae $m_i^k$ 610 includes L concentric circles of radii $r_l$, 1≤l≤L, with each circle having $K_l$ sampling points $p_{l,m}$, equally distributed along the circumference.

To make these features invariant to rotation around the keypoint, in one embodiment, the orientations at. the sampling points $$\frac{2\pi r_l m}{K_l},$$

(0≤m≤$K_l$−1) are taken relative to the orientation $\theta_i^k$ of minutiae $m_i^k$. In other words, we denote by $\theta_{l,m}^k$ the local ridge orientation estimated in $p_{l,m}$. The orientation-based descriptor is $$o_i^k = \left\{\left\{\frac{\min(|2\pi - (\theta_{l,m}^k - \theta_i^k)|, |\theta_{l,m}^k - \theta_i^k|)}{\pi}\right\}_{m=1}^{K_l}\right\}_{l=1}^{L}.$$

Division by it ensures that each feature element is in the range [0,1].

In addition, some embodiments, after deriving the minutiae-based, texture-based, and orientation-based descriptors around each keypoint, combine those descriptors for each regions to determine the descriptor of the region.

After deriving the minutiae-based, texture-based, and orientation-based descriptors around each key-point, the descriptor for the $k^{th}$ fingerprint image is obtained by concatenating the descriptor for each keypoint as:

$$M^k = \begin{bmatrix} m_1^k \\ \vdots \\ m_U^k \end{bmatrix} \quad T^k = \begin{bmatrix} t_1^k \\ \vdots \\ t_U^k \end{bmatrix} \quad O^k = \begin{bmatrix} o_1^k \\ \vdots \\ o_U^k \end{bmatrix},$$

wherein $M^k$ is a descriptor including minutiae-based features of the fingerprint k, $T^k$ is a descriptor including texture-based features of the fingerprint k and $O^k$ a descriptor including orientation-based features of fingerprint k.

Fingerprint Comparison

Various embodiment of the invention use different techniques for comparing the descriptors. For example, one embodiment of the invention compares the descriptors by determining a similarity matrix, as described below.

$M^k$ and M' are the first and the second set of descriptors of the $k^{th}$ enrolment and probe fingerprints, respectively. There are $U_k$ minutiae key-points in $M^k$, and U' key-points in M'. The comparing method estimates one-to-one correspondences between the first and the second set of descriptors.

This embodiment defines a measure of similarity between the descriptors $M^k = \{m_i^k\}_{i=1}^{U_k}$ and $M' = \{m'_j\}_{j=1}^{U'}$ using a similarity matrix $U_k \times U'$ whose elements are $$S(i,j) = \|m_i^k - m'_j\|_1.$$

Indices (i,j) of elements having a small value in the matrix S are indicative of a potential match between the descriptors. The descriptor i in the first set $M^k$ and the descriptor/in the second set M' match if the corresponding descriptors are more similar to each other than to the descriptors from any other pairs in $M^k$ and M'. This relationship indicate that a descriptor i in the first: set: $M^k$ and a descriptor in the second set M' match if the distance between the descriptors i and/is smaller than the distance between i and any other descriptor j' in the probe fingerprint.

The similarity can be formulated as $$P_m(i, j) = \frac{S(i, j)}{\sum_{j'=1}^{U'} S(i, j') + \sum_{i'=1}^{U_k} S(i', j) - 2S(i, j)}.$$

After the matrix $P_m$ is determined, the coordinates of the minimum $P_m$ indicate a match between the descriptors. 'The corresponding column and row are removed and the process is repeated until all matching descriptors are identified. Finally, the number of matching descriptors whose correspondence value is less than a certain threshold $\tau_m$ is used to determine the score as $$S_m = \frac{M_{matched}}{\min(U_k, U')},$$

where $M_{matched}$ is the number of matching descriptors (i, j) for which $p_m(i,j) \leq \tau_m$.

A similar score calculation is also performed for different types of the descriptors, such as texture-based and orientation-based descriptors to obtain scores $S_t$ and $S_o$, respectively. The value of the threshold $\tau_m$, and corresponding thresholds $\tau_t$ and $\tau_o$ for texture and orientation based descriptors can be derived empirically. The scores can be used to determine the receiver operating characteristic (ROC) curves, either individually, or in combinations of two or three feature types.

In particular, when all three scores are used, a fused score is a linear combination, $$S = w_m S_m + w_t S_t + w_o S_o,$$

where the weights $w_m$, $w_t$, $w_o$ satisfy $w_m + w_t + w_o = 1$. The values of $w_m$, $w_t$, $w_o$ can be obtained by performing an exhaustive search to determine the values that minimize an equal error rate (EER) on a training subset of the damsel.

Secure Authentication System

Figure 7:
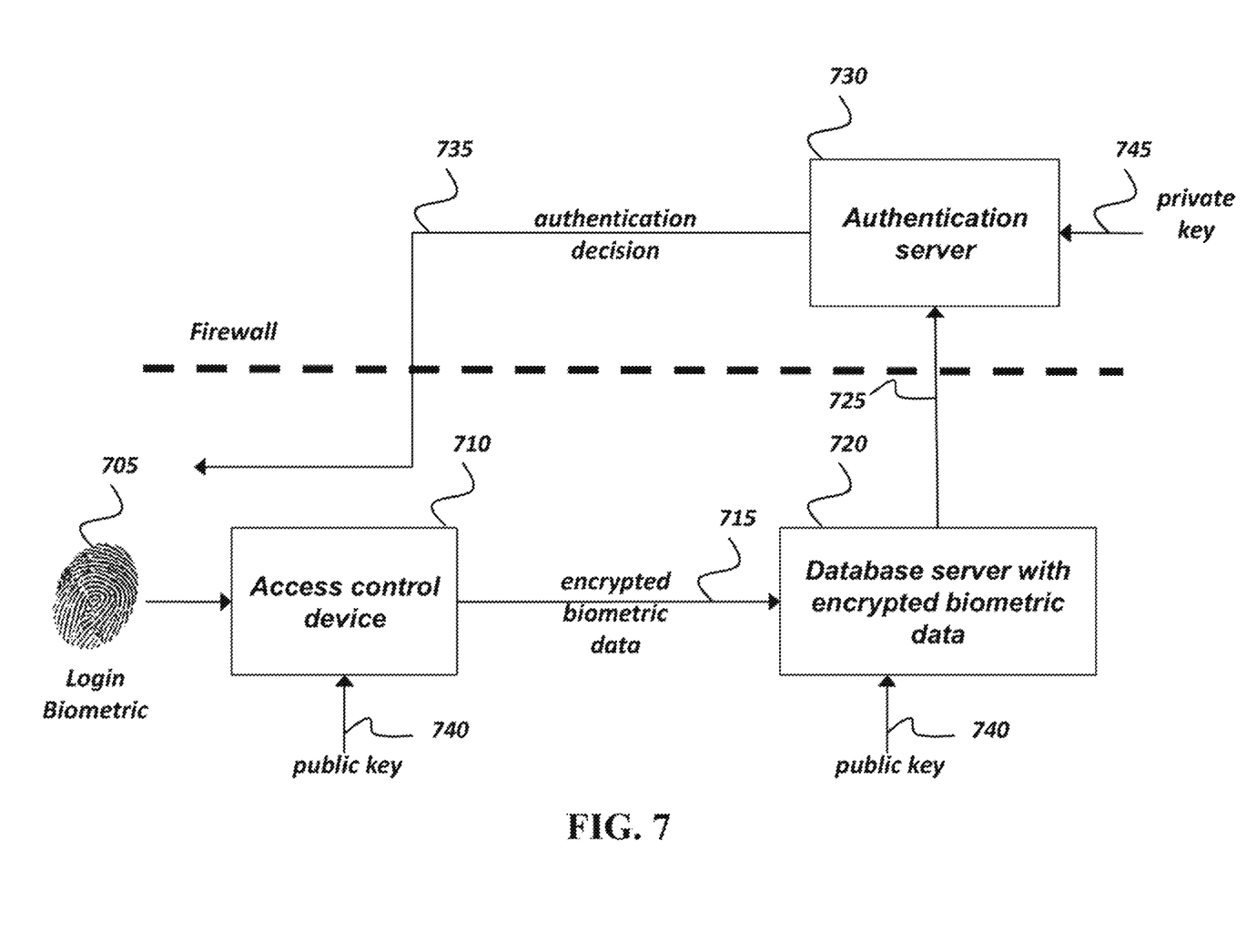
FIG. 7 is a block diagram of various modules of an authentication method and a system for authenticating an encryption of biometric data according to some embodiments of the invention.

FIG. 7 shows a block diagram of various modules of an authentication method and a system for authenticating an encryption of biometric data 705 according to some embodiments of the invention. Various embodiments of the invention employ one or several modules of the system of FIG. 7, The modules can include an access control device 710 acquiring and encrypting with a public key 740 the biometric data 705 of a user who seeks to be authenticated. The access control device transmits the encrypted biometric data 715 to a database server 720. The biometric data 715 includes the first set of descriptors 135 in the encrypted format. The database server 720 stores user-specific enrolment biometric data encrypted with the public key 740. The enrolment biometric data can include the second set of descriptors 136 in the encrypted format.

The server 720 determines distance, in an encrypted domain, between the descriptors of the first and the second set to determining a number of the matching descriptors 725. The number 725 is transmitted to an authentication server 730 for rendering the authentication decision 735. In some embodiments, the number of matching descriptors is determined via an interactive protocol between the authentication server 730 and the database server 720. In some embodiments, the authentication server can be a standalone server. In other embodiments, it can be implemented as a part of the access control device 710 or the database server 720. The authentication server can use private key 745, if necessary to decrypt the number 725.

The above-described embodiments of the present invention can be implemented in any of numerous ways. For example, the embodiments may be implemented using hardware, software or a combination thereof When implemented in software, the software code can be executed on any suitable processor or collection of processors, whether provided, in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input, and output devices. These devices can be used, among other things, to present a user interface. Examples of output devices that can be used to provide, a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate, code that is executed on a framework or virtual machine.

In this respect, the invention may be embodied as a computer readable storage medium or multiple computer readable media, e.g., a computer memory, compact discs (CD), optical discs, digital video disks (DVD), magnetic tapes, and flash memories. Alternatively or additionally, the invention may he embodied as a computer readable medium other than a computer-readable storage medium, such as a propagating, signal.

The terms "program" or "software are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to he understood that various other adaptations and modifications can be made within the spirit and scope of the invention. Therefore, it is the object of the appended claims to cover all such variations and modifications as come within the true spirit and scope of the invention.

We claim:

1. A method for authenticating biometric data obtained from a fingerprint of a user, comprising:
   determining a set of regions of the fingerprint, such that each region includes multiple minutiae of the fingerprint;
   determining, for each region, a descriptor representing a structure of the fingerprint in the region to produce a first set of descriptors;
   comparing each descriptor in the first set of descriptors with each descriptor in a second set of descriptors to determine a number of matching descriptors, wherein the second set of descriptors is determined during an enrolment of the biometric data of the user; and
   comparing the number of matching descriptors with a threshold for authenticating the biometric data, wherein steps of the method are performed by a processor.

2. The method of claim 1, wherein determining the set of regions comprises:
   determining a shape and dimensions of the region;
   arranging the region around each minutia in the fingerprint;
   selecting the region in the set of regions, if the minutia of the region neighboring at least n minutiae within the region, wherein n is a predetermined number greater than one.

3. The method of claim 2, further comprising:
   counting a number of regions in the set; and
   changing at least one of the shape of the region, the dimensions of the region or the predetermined number; and
   repeating the determining the set of regions.

4. The method of claim 1, wherein the second set of descriptors is encrypted with a public key of a homomorphic cryptosystem, further comprising:
   encrypting the first set of descriptors with the public key, such that the comparing of each descriptor is performed in an encrypted domain using homomorphic properties.

5. The method of claim 4, further comprising:
   generating an encrypted result corresponding to the number of matching descriptors; and
   decrypting the encrypted result at an authentication server to determine an authentication decision.

6. The method of claim 1, wherein the descriptor of the region includes minutiae-based features representing at least one or combination of relative distances of minutiae within the region, relative distances of orientations of the minutiae within the region, and relative distances of radial placements of the minutiae within the region.

7. The method of claim 1, wherein the descriptor of the region includes a combination of minutiae-based features, texture-based features and orientation-based features.

8. The method of claim 1, wherein the comparing comprises:
   determining, for a descriptor in the first set, a nearest descriptor from the second set; and
   determining a distance between the descriptor and the nearest descriptor; and
   comparing the distance with a distance threshold to determine the matching descriptors.

9. A system for authenticating biometric data obtained from a fingerprint of a user, comprising a processor for:
   determining a set of regions of the fingerprint such that :each region includes multiple minutiae of the fingerprint;
   determining, for each region, a descriptor representing a structure of the fingerprint in the region to produce a first set of descriptors;
   comparing each descriptor in the first set of descriptors with each descriptor in a second set of descriptors to determine a number of matching descriptors, wherein the second set of descriptors is determined during an. enrolment of the biometric data of the user; and
   comparing the number of matching descriptors with a threshold for authenticating the biometric data.

10. A biometric authentication system, comprising;
    an access control device for determining a first set of descriptors of a probe fingerprint presented for an authentication old user, wherein each descriptor in the first set represents a region of the probe fingerprint that s includes multiple minutiae;
    a server for determining a second set of descriptors of a enrolment fingerprint presented for an enrolment of the user, wherein each descriptor in the second set represent a region of the enrolment fingerprint that includes multiple minutiae;
    a processor for comparing each descriptor in the first set of descriptors with each descriptor in a second set of descriptors to determine a number of matching descriptors; and
    an authentication server for comparing the number of matching descriptors with a threshold to make an authentication decision.

11. The authentication system of claim 10, wherein the processor is running on the access control device or on the server.

12. The authentication system of claim 10, wherein the access control device encrypts the first set of descriptors with a public key, wherein the server encrypts the second set of descriptors with the public key, and wherein the processor compares the descriptor in the encrypted domain.

* * * * *